United States Patent [19]
McNabb

[11] Patent Number: 6,113,790
[45] Date of Patent: Sep. 5, 2000

[54] PROCESS FOR REMOVING WATER-SOLUBLE ORGANICS FROM WASTE STREAMS

[75] Inventor: Andy J. McNabb, Lake Jackson, Tex.

[73] Assignee: BASF Corporation, Mt. Olive, N.J.

[21] Appl. No.: 09/215,399

[22] Filed: Dec. 18, 1998

[51] Int. Cl.$^7$ .................................................... C02F 1/26
[52] U.S. Cl. .............................. 210/631; 203/39; 203/43; 210/694; 210/638; 210/903; 210/908; 568/749; 568/913
[58] Field of Search .................................... 210/634, 638, 210/639, 725, 729, 908, 909, 631, 694, 903; 203/39, 43; 568/749, 913

[56] References Cited

U.S. PATENT DOCUMENTS

| | | | |
|---|---|---|---|
| 3,966,594 | 6/1976 | Ohkawa et al. | 210/634 |
| 4,487,698 | 12/1984 | Idel et al. | 210/639 |
| 4,518,502 | 5/1985 | Burns et al. | 210/634 |
| 4,818,410 | 4/1989 | Bellos et al. | 210/639 |
| 4,839,054 | 6/1989 | Ruebush et al. | 210/639 |
| 4,948,511 | 8/1990 | Swanson et al. | 210/634 |
| 5,364,532 | 11/1994 | Bellos et al. | 210/639 |
| 5,705,074 | 1/1998 | Brient | 210/634 |

FOREIGN PATENT DOCUMENTS 0 586 107 A1  3/1994  European Pat. Off. .

*Primary Examiner*—Peter A. Hruskoci
*Attorney, Agent, or Firm*—Alston & Bird LLP

[57] ABSTRACT

The invention relates to a 3-step process for removing water-soluble organics from waste streams. The first step involves contacting a waste stream with base, the second step involves contacting the organics-containing water with free oil and finally the free oil phase is separated from the aqueous phase to produce substantially organic-free water.

15 Claims, No Drawings

PROCESS FOR REMOVING WATER-SOLUBLE ORGANICS FROM WASTE STREAMS

BACKGROUND OF THE INVENTION

The present invention relates to a process for removing water-soluble organics from waste streams. In the first step, the organics-containing water is contacted with base to reduce the solubility of the dissolved organics. In the second step, the organics-containing water is contacted and thoroughly mixed with a free oil to coalesce the dissolved organics. In the third step, the free oil phase is separated from the aqueous phase to produce substantially organic-free produced water.

A variety of industrial processes generate aqueous waste streams containing contaminating amounts of organic compounds. Before such streams can be discharged into a receiving body of water, the organics content must be substantially reduced to meet state and federal regulatory standards.

For example in the manufacture of polyethyleneimine the process usually generates waste water streams. The water may contain significant amounts of dissolved sodium salts and other contaminating hydrocarbons. If not removed, these contaminants are measured as oil and grease when the water is acidified and freon extracted, pursuant to EPA gravimetric test methods. Thus, it is desirable to treat such water so that it can be discharged without violating regulatory standards.

Previous workers in the field attempted to remove dissolved organic contaminants by acidification. They believed that the dissolved organics would form a free oil phase at low pH's and could be removed by settling or flotation. For example, U.S. Pat. No. 4,401,570 discloses a method of removing organic esters from waste water using acidification. We have found, however, that these organics are too finely dispersed to allow them to settle or float. Thus, the organics remained and continued to result in unacceptable levels of oil and grease in the water stream.

Accordingly, it is the principle object of this invention to economically remove water-soluble organics from waste streams.

SUMMARY OF THE INVENTION

This invention concerns a process for removing water-soluble organics from waste streams. The process comprises: forming a mixture; agitating the mixture to produce a thoroughly mixed phase; and separating the phase to produce a free oil phase and a clean water phase.

Wastewater is mixed with a base (such as sodium hydroxide or potassium hydroxide) in order to increase the pH of the wastewater to a pH of 9–13.5. The wastewater is then extracted with an alkyphenol solvent (such as Butylphenol, Octylphenol. Nonylphenol, Dodecylphenol). The extract contains the solvent and much of the TOC originally present in the wastewater. The raffinate contains the aqueous salt solution. The extract is then distilled for solvent recovery. The solvent is recycled in order to minimize operating costs. The recovered organics are either burned in an incinerator, sold, or further purified by conventional purification techniques. An inorganic acid (such as sulfuric acid or hydrochloric acid) is added to the raffinate for neutralization. With a lower TOC in the raffinate, the wastewater can then be treated at much lower costs in a biological treatment plant and/or activated carbon system.

In the remainder of the specification, we will describe a waste treatment system suitable for removing water-soluble organics from waste streams. Those skilled in the art of waste water treatment will appreciate that the volumes and amounts of reactants can be varied widely to accommodate the specific make-up of any waste streams.

More specifically, an aqueous waste stream containing sodium sulfate, monoethanolamine, and other components is produced during the manufacturing of polyethyleneimine. Extensive facilities are required for disposal of this stream. The size and operating costs for these facilities could be greatly reduced or eliminated if a suitable method for reducing the organic content in the aqueous phase was available.

This invention is a process which reduces the organic content of aqueous inorganic salt solutions by adjustments of the wastewater pH to a specific range followed by extraction with a special organic solvent. In the process, the pH of the wastewater is raised to approximately 9.5–13.5 by the addition of a hydroxide such as sodium hydroxide, potassium hydroxide, etc. The wastewater is then extracted with an alkylphenol solvent such as butylphenol. octylphenol, nonylphenol, or dodecylphenol. The organic solvent may then be recovered by either conventional distillation methods or by washing with an aqueous acidic solution followed by phase separation. The recovered organics can be either incinerated for fuel value or further purified by conventional distillation techniques.

EXAMPLE 1

The TOC of wastewater produced during the manufacturing of Polyethyleneimine was measured and found to be 6500 ppm. The sodium sulfate content of the wastewater was approximately 20%. Caustic was added to the wastewater until a pH of 13 was obtained. The wastewater was extracted three times with Octylphenol at 90° C. using a solvent to feed ratio of 2:1. The TOC of the raffinate was measured and found to be 470 ppm, a TOC reduction of 92.5%.

EXAMPLE 2

The TOC of wastewater produced during the manufacturing of Polyethyleneimine was measured and found to be 6500 ppm. The sodium sulfate content of the wastewater was approximately 20%. Caustic was added to the wastewater until a pH of 11 was obtained. The wastewater was extracted one time with Butylphenol at 90° C. using a solvent to feed ratio of 1:1. The TOC of the raffinate was measured and found to be 1,020 ppm, a TOC reduction of 84%.

EXAMPLE 3

The TOC of wastewater produced during the manufacturing of Polyethyleneimine was measured and found to be 6500 ppm. The sodium sulfate content of the wastewater was approximately 20%. Caustic was added to the wastewater until a pH of 12 was obtained. The wastewater was extracted one time with Nonylphenol at 90° C. using a solvent to feed ratio of 1:1. The TOC of the raffinate was measured and found to be 1,965 ppm, a TOC reduction of 69.2%.

EXAMPLE 4

The TOC of wastewater produced during the manufacturing of polyethyleneimine was measured and found to be 6500 ppm. The sodium sulfate content of the wastewater was approximately 20%. Caustic was added to the wastewater until a pH of 13 was obtained. The wastewater was extracted one time with Dodecylphenol at 90° C. using a solvent to feed ratio of 1:1. The TOC of the raffinate was measured and found to be 2,470 ppm, a TOC reduction of 60.4%.

EXAMPLE 5

The TOC of wastewater produced during the manufacturing of Polyethyleneimine was measured and found to be 6500 ppm. The sodium sulfate content of the wastewater was approximately 20%. Caustic was added to the wastewater until a pH of 7 was obtained. The wastewater was extracted one time with Octylphenol at 90° C. using a solvent to feed ratio of 1:1. The TOC of the raffinate was measured and found to be 6,530 ppm, an increase of 0.5%. This indicates the need for the pH adjustment.

EXAMPLE 6

The TOC of wastewater produced during the manufacturing of Polyethyleneimine was measured and found to be 6500 ppm. The sodium sulfate content of the wastewater was approximately 20%. Caustic was added to the wastewater until a pH of 10 was obtained. The wastewater was extracted one time with Octylphenol at 90° C. using a solvent to feed ratio of 1:1. The TOC of the raffinate was measured and found to be 4,570 ppm, a TOC reduction of 29.4%.

I claim:

1. A process for removing water-soluble organic compounds including monoethanolamine from an aqueous waste stream comprising:

contacting an aqueous waste stream that includes said water-soluble organic compounds with a base to reduce the solubility of the organic compounds and increase the pH to between 9 and 13.5;

mixing the aqueous waste stream with an alkylphenol solvent to produce an aqueous raffinate and an extract, the extract containing the organic compounds from the aqueous waste stream and the alkylphenol solvent;

separating the raffinate and the extract.

2. The process according to claim 1, further comprising the step of distilling the extract to separate the organic compounds and the alkylphenol solvent in the extract.

3. The process according to claim 2, further comprising the step of incinerating the organic compounds after said distilling step.

4. The process according to claim 2, further comprising the step of purifying the organic compounds after said distilling step.

5. The process according to claim 1, further comprising the steps of washing the extract with an aqueous acidic solution and extracting the organic compounds by phase separation.

6. The process according to claim 5, further comprising the step of incinerating the organic compounds after said extracting step.

7. The process according to claim 5, further comprising the step of purifying the organic compounds after said extracting step.

8. The process according to claim 1, further comprising the step of neutralizing the raffinate by mixing the raffinate with an acid.

9. The process according to claim 8, wherein said neutralizing step comprising neutralizing the raffinate with an acid selected from the group consisting of sulfuric acid and hydrochloric acid.

10. The process according to claim 8, further comprising the step of purifying the raffinate using activated carbon or a biological treatment.

11. The process according to claim 1, wherein said contacting step comprises contacting the aqueous waste stream with a base selected from the group consisting of sodium hydroxide and potassium hydroxide.

12. The process according to claim 1, wherein said mixing step comprises mixing the aqueous waste stream with an alkylphenol solvent selected from the group consisting of butylphenol, octylphenol, nonylphenol and dodecylphenol.

13. The process according to claim 1, wherein said contacting step comprises contacting an aqueous waste stream produced in the manufacture of polyethyleneamine with a base.

14. The process according to claim 1, wherein after said contacting step, the waste stream has a pH of between 9.5 and 13.5.

15. The process according to claim 1, wherein said mixing step further comprises agitating the aqueous waste stream and the alkylphenol solvent.

* * * * *